United States Patent
Gu et al.

(10) Patent No.: US 11,467,831 B2
(45) Date of Patent: Oct. 11, 2022

(54) SYSTEM AND METHOD FOR PIPELINED TIME-DOMAIN COMPUTING USING TIME-DOMAIN FLIP-FLOPS AND ITS APPLICATION IN TIME-SERIES ANALYSIS

(71) Applicant: Northwestern University, Evanston, IL (US)

(72) Inventors: Jie Gu, Evanston, IL (US); Zhengyu Chen, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 17/311,849

(22) PCT Filed: Dec. 18, 2019

(86) PCT No.: PCT/US2019/067285
§ 371 (c)(1),
(2) Date: Jun. 8, 2021

(87) PCT Pub. No.: WO2020/132142
PCT Pub. Date: Jun. 25, 2020

(65) Prior Publication Data
US 2022/0019434 A1    Jan. 20, 2022

Related U.S. Application Data

(60) Provisional application No. 62/781,425, filed on Dec. 18, 2018.

(51) Int. Cl.
G06F 9/30     (2018.01)
G06F 7/60     (2006.01)
G06F 9/355    (2018.01)

(52) U.S. Cl.
CPC ........ *G06F 9/30029* (2013.01); *G06F 7/605* (2013.01); *G06F 9/3001* (2013.01); *G06F 9/3555* (2013.01)

(58) Field of Classification Search
None
See application file for complete search history.

(56) References Cited

U.S. PATENT DOCUMENTS 4,811,210 A      3/1989   McAulay
5,357,613 A *   10/1994   Cantrell ............... G06F 13/405
                                                          710/61

(Continued)

FOREIGN PATENT DOCUMENTS

WO     2017/124116 A1    7/2017

OTHER PUBLICATIONS

Mueller, M., Information Retrieval for Music an Motion, 2007,Springer, pp. 68-84. (Year: 2007).*

(Continued)

*Primary Examiner* — Eric Coleman
(74) *Attorney, Agent, or Firm* — Benesch, Friedlander, Coplan & Aronoff LLP

(57) ABSTRACT

Systems and/or methods can include a ring based inverter chain that constructs multi-bit flip-flops that store time. The time flip-flops serve as storage units and enable pipeline operations. Single cells used in time series analysis, such as dynamic time warping are rendered by the time-domain circuits. The circuits include time flip-flops, Min, and ABS circuits. A and the matrix can be constructed through the single cells.

12 Claims, 11 Drawing Sheets

(56) References Cited

U.S. PATENT DOCUMENTS

| | | | |
|---|---|---|---|
| 5,473,731 A * | 12/1995 | Seligson | G06V 10/754 |
| | | | 706/29 |
| 6,389,377 B1 | 5/2002 | Pineda et al. | |
| 9,014,216 B2 * | 4/2015 | Lazar | H03M 1/125 |
| | | | 370/521 |
| 10,310,015 B2 * | 6/2019 | Clouqueur | G01R 31/318552 |
| 10,795,045 B1 * | 10/2020 | Starkey | G01V 3/081 |
| 10,938,405 B1 * | 3/2021 | Honarparvar | H03M 1/661 |
| 2010/0138218 A1 * | 6/2010 | Geiger | G10L 19/265 |
| | | | 704/211 |
| 2015/0199010 A1 | 7/2015 | Coleman et al. | |
| 2016/0105186 A1 | 4/2016 | Sullman et al. | |
| 2016/0314818 A1 | 10/2016 | Kirk et al. | |
| 2017/0323481 A1 | 9/2017 | Tran et al. | |

OTHER PUBLICATIONS

International Search Report and Written Opinion in International Application No. PCT/US19/67285, dated Mar. 5, 2020 (7 pages).

* cited by examiner

SYSTEM AND METHOD FOR PIPELINED TIME-DOMAIN COMPUTING USING TIME-DOMAIN FLIP-FLOPS AND ITS APPLICATION IN TIME-SERIES ANALYSIS

CROSS-REFERENCE TO RELATED APPLICATIONS

The present application is a National Stage Entry of PCT International Patent Application No. PCT/US2019/067285 entitled "System and Method for Pipelined Time-Domain Computing Using Time-Domain Flip-Flops and its Application in Time-Series Analysis," filed on Dec. 18, 2019, which claims priority to and the benefit of U.S. Provisional Patent Application Ser. No. 62/781,425 entitled "System and Method for Pipelined Time-domain Computing using Time-Domain Flip-flops and its Application in Time-Series Analysis," filed on Dec. 18, 2018, the disclosures of which are all hereby incorporated by reference in their entireties for all purposes.

STATEMENT OF FEDERALLY FUNDED RESEARCH OR SPONSORSHIP

This invention was made with government support under grant number CCF-1846424 awarded by the National Science Foundation. The United States government has certain rights in the inventions.

BACKGROUND

Some microprocessor designs have reached a bottleneck on further improvements related to speed, e.g., which can cause delay in the transmission of data through the microprocessor. The delay can occur when a system's bandwidth cannot support the amount of information being relayed at the speed it is processed. Bottlenecks can affect microprocessor performance by slowing down the flow of information between the computer processing unit (CPU) and memory.

BRIEF DESCRIPTION OF DRAWINGS

The disclosure is better understood with reference to the following drawings and description.

The elements in the figures are not necessarily to scale, emphasis instead being placed upon illustrating the principles of the disclosure. Moreover, in the figures, like-referenced numerals may designate to corresponding parts throughout the different views.

DESCRIPTION

The system and/or methods h can improve energy efficiency of time domain signal processing. One example of energy efficient time domain signal processing is described in commonly assigned Pub. Patent Application No. 2017/0194982, entitled, "System and Method for Energy Efficient Time Domain Signal Processing," the entire contents of which are incorporated by reference herein. In some existing designs, a lack of storage unit prevents time-domain pipeline structure computing.

The disclosure describes systems and/or methods using new time-domain flip-flops (TFF) to build pipelined structure. The enabled pipeline structure may enhance throughputs of the design. A simple logic operation in the pipeline structure is also described, such as Min, ABS operations in time-domain that carry out a dynamic time warping algorithm using time-domain circuits hardware constructions. Examples of a hardware implemented method using circuit techniques carry out dynamic time warping algorithm for time series analysis finds applications in voice recognition, motion detection, DNA sequencing, etc.

Dynamic time warping (DTW) is a variant of the dynamic programming algorithm, is used for time signal classifications. The strong capability of distance measurement for variable speed temporal sequences makes DTW a prevalent method for time series classifications in broad applications such as, ECG diagnosis, DNA sequencing, etc. Several efforts have been proposed in accelerating the operation including a recent demonstration of race-logic. However, the demonstration is confined to a single-bit operation, not scalable with variable sequence length and has low throughput due to its non-pipelined operation. To overcome those challenges, the systems and/or methods describe a DTW engine for time series classifications using time-domain computing. A pipelined operation uses time flip-flop (TFF) which can lead to an order of magnitude improvements in throughput and a scalable processing capability of time sequence. Compared with recent time-domain designs which suffer from low bit precision and lack of memory element, a pipeline structure is implemented all in time-domain with up to a 10 bit resolution.

Figure 1:
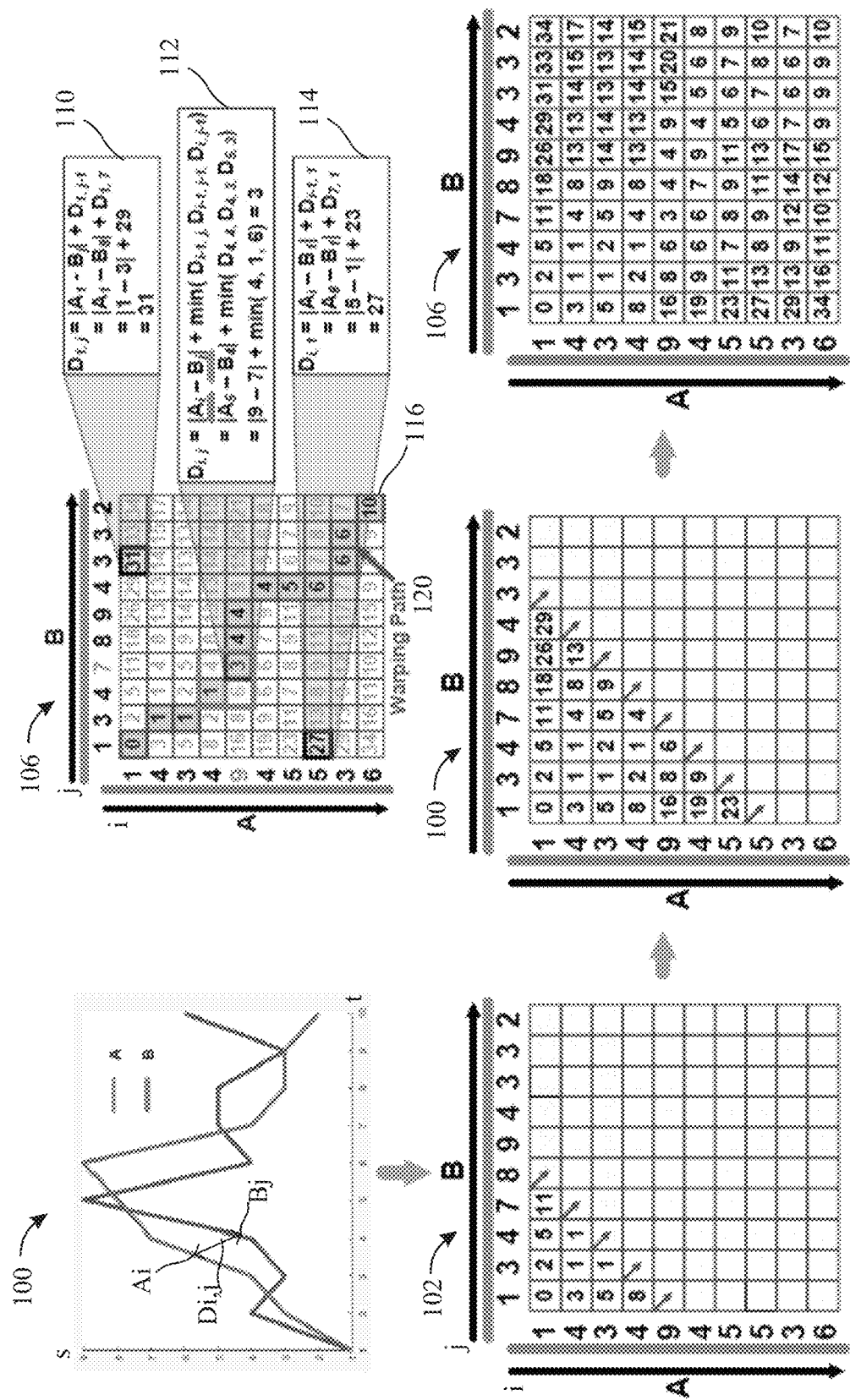
FIG. 1 illustrates an example dynamic time warping algorithm and time-domain dynamic time warping implementation.

FIG. 1 illustrates an example dynamic time warping algorithm and time-domain dynamic time warping implementation. Graphs 102 to 108 shows executions progression of a basic principle of DTW algorithm which detects similarities $D_{i,j}$ among temporal signals $A_i$ and $B_j$ for two time series A and B (x-axis for t) as shown in graph 100 despite of variable speed s (y-axis for s). Graphs 102 to 108 show that data similarity $D_{i,j}$ can be formulated as a summation of absolute difference $|A_i - B_j|$ and minimum value of its three ancestor nodes $\min(D_{i-1,j}, D_{i,j-1}, D_{i-1,j-1})$ where $A_i$ and $B_j$ denotes the ith and jth elements of A, B and $D_{i,j}$ denotes the DTW value at node (i,j).

A "warping path" 120 is produced in order to align the two signals Ai and Bj in time t as marked in graph 100 of FIG. 1. Hardware implemented time-domain operations can provide advantages in performing the warping and comparison operation due to its efficiency in key operations such as Minimum (MIN), absolute (ABS) which only require a few hardware logic gates. The lower side of FIG. 1 shows the time-domain principle of DTW where digital inputs of time-domain data samples Ai and Bj are converted into quantized pulse width (see FIGS. 2-4) and further processed (ABS, MIN) in time domain by logic gates. The pulse T (Di,j) can be obtained by an accumulation of the pulses of |Ai−Bj| and min(Di−1, j, Di, j−1, Di−1,j−1), both of which are generated by the time-domain MIN module and ABS module. Both accumulation and pipeline operation are realized by the TFF.

Figure 2:
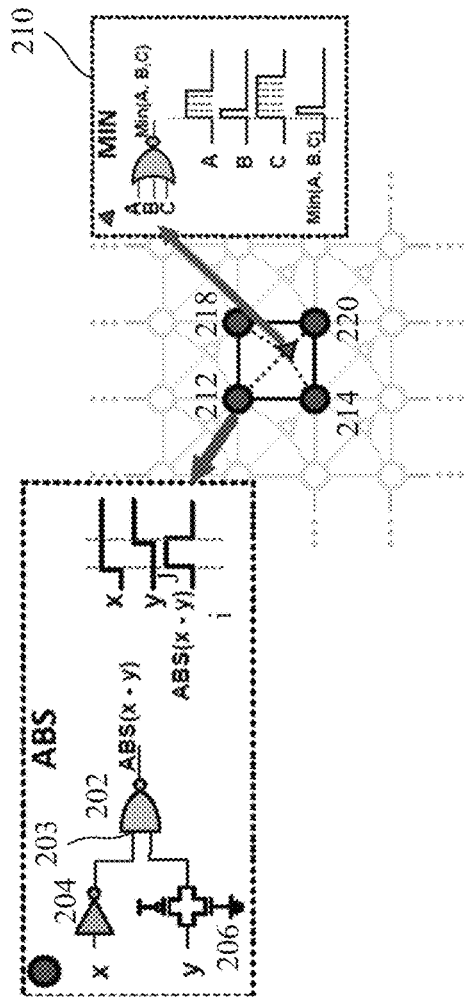
FIG. 2 is a hardware implementation that carries out an absolute (ABS) operation and a minimum (MIN) operation.

FIG. 2 is a hardware implementation that carries out an absolute (ABS) operation and a minimum (MIN) operation in the DTW algorithm. In practice, the entire DTW algorithm may be implemented through hardware (see FIGS. 5-10) instead of through a software method which runs on a CPU. For example, the ABS operation may be performed by a NAND gate 202 which takes a difference between two input pulses X and Y, wherein only one of the NAND gate's input 203 is buffered with an inverter 204, while another input y of the NAND gate may be a transmission gate 206. The MIN operation may be performed by a multi-input NOR gate 210, which compares all input pulses A, B, C and selects a minimum pulse value B among all input signals.

Figure 3:
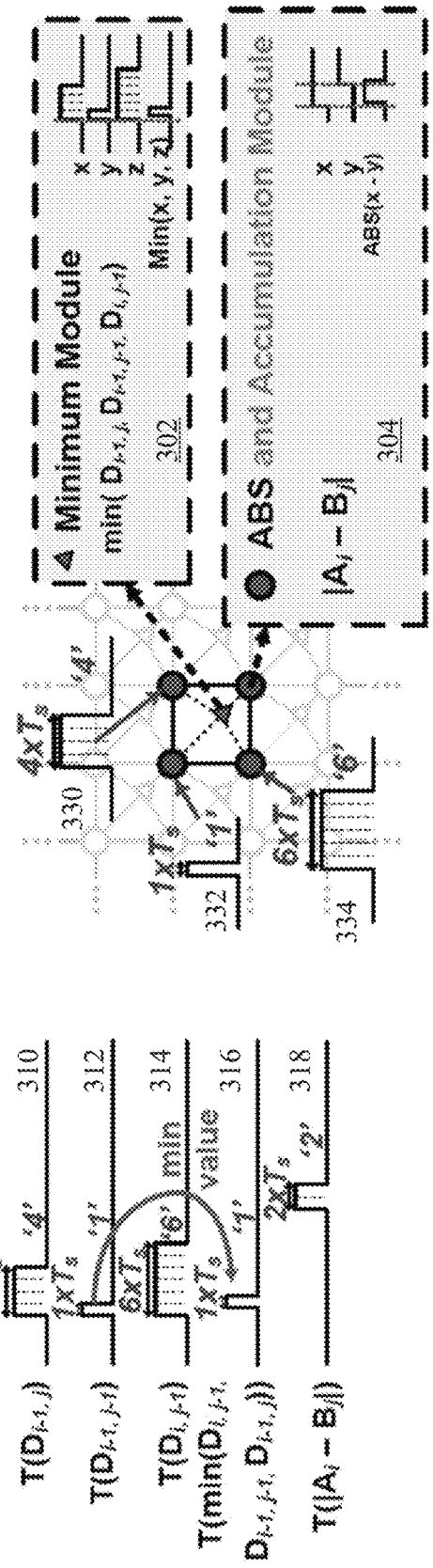
FIG. 3 illustrates digital inputs that are converted into quantized pulse widths for time-domain signals processing.
Figure 4:
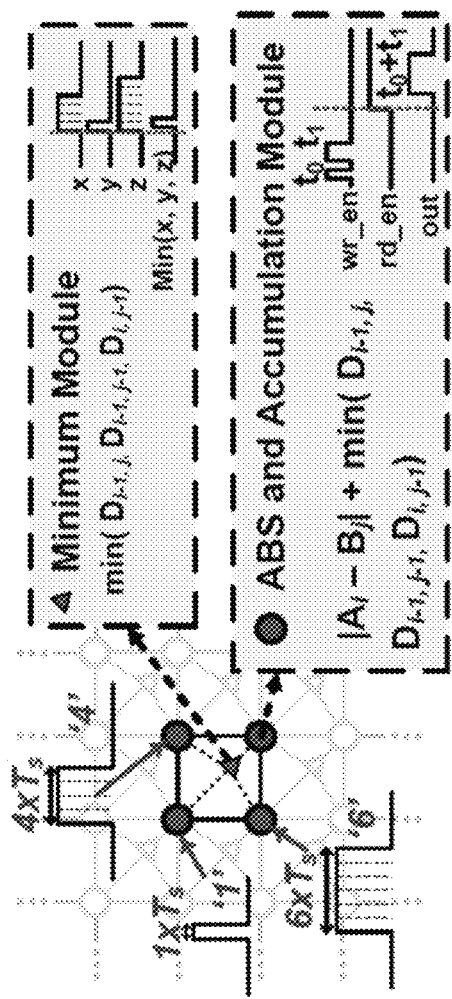
FIG. 4 illustrates digital inputs that are converted into quantized pulse widths for another time-domain signals processing.
Figure 4:
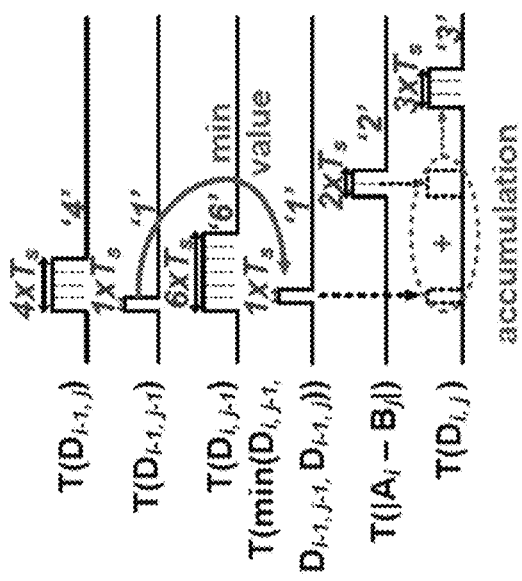

FIG. 3 illustrates digital inputs are converted into quantized pulse widths 310-314 (T(Di−1, j), T(Di−1, j−1) and T(Di, j−1)) for time-domain signals processing such as a MIN operation 302 to produce pulse 316 or take an ABS operation 304. FIG. 4 illustrates digital inputs that are converted into quantized pulse widths for other time-domain signals processing, for example, performing an accumulation step by combining both.

Figure 5:
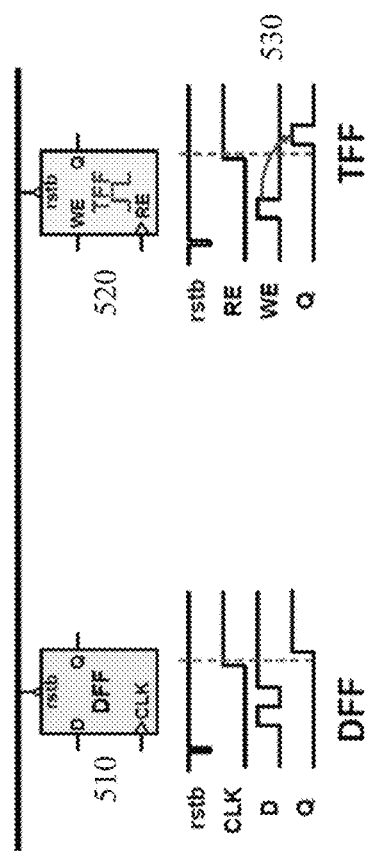
FIG. 5 is a circuit diagram of a time-domain Flip-Flop (TFF) based hardware implementation that carries out an absolute (ABS) operation and a minimum (MIN) operation.

FIG. 5 is a circuit diagram of a time-domain Flip-Flop (TFF) 520, which processes a time-domain signal 330 received at a write enabled (WE) port to produce another time pulse at output Q. Contrary to a digital flip-flop (DFF), a digital transition signal is instead received at an input D, however, the logic state is set to high at the output at Q instead of outputting as a pulse. Therefore, the conventional DFF is not suitable for time-domain signals processing.

Figure 6:
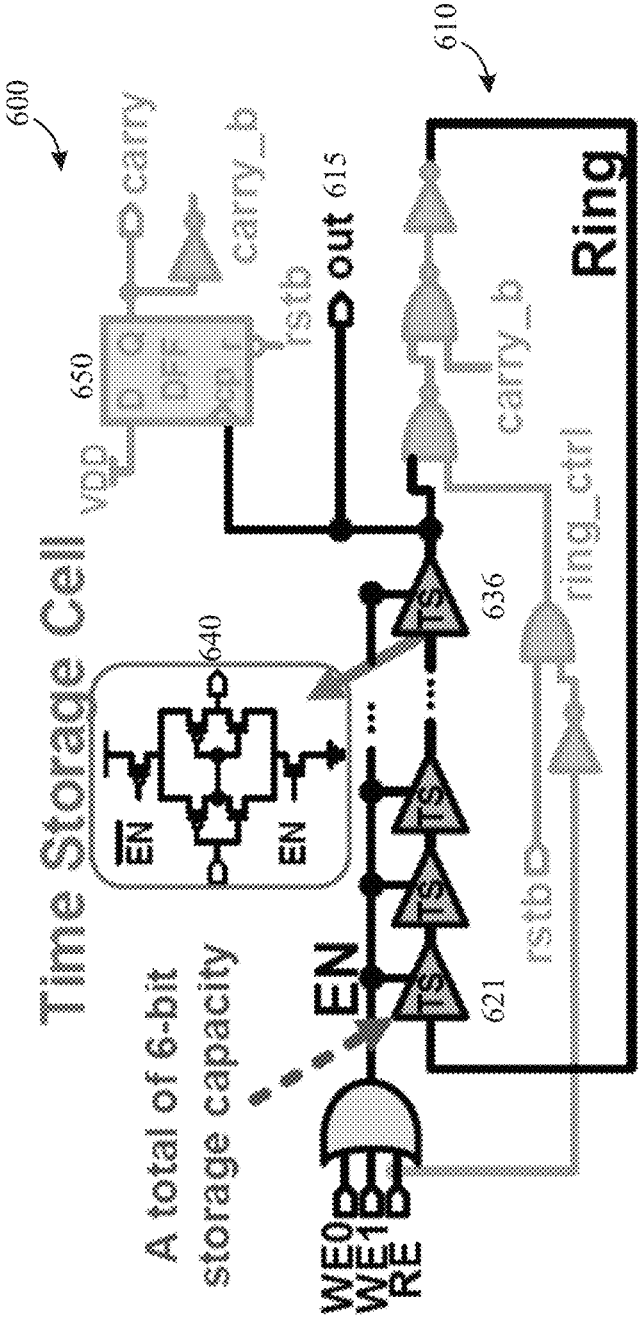
FIG. 6 is an example of a ring-based time flip-flop, and other time-domain circuits.

FIG. 6 shows a ring-based multi-bit TFF 600. In one example, a 16-stage tri-state inverter chain 621-636 serves as the time storage unit. During reset phase, rstb signal is sent to reset voltages in the internal nodes of the TFF 650. During the write phase, input pulses are sent to the ring 610, which allows propagation of "0" through the ring with a duration of input pulses. Multiple input pulses can be repeatedly sent to TFF 650 and will be accumulated through the propagation of the ring 610.

Figure 8:
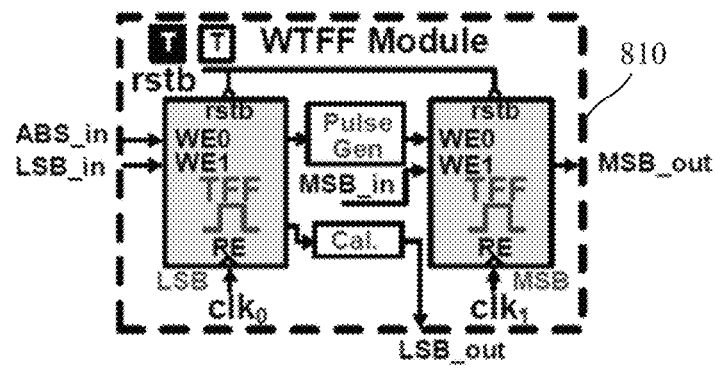
FIGS. 8-10 illustrate various hardware implementations for carrying out time-domain signal processing.
Figure 9:
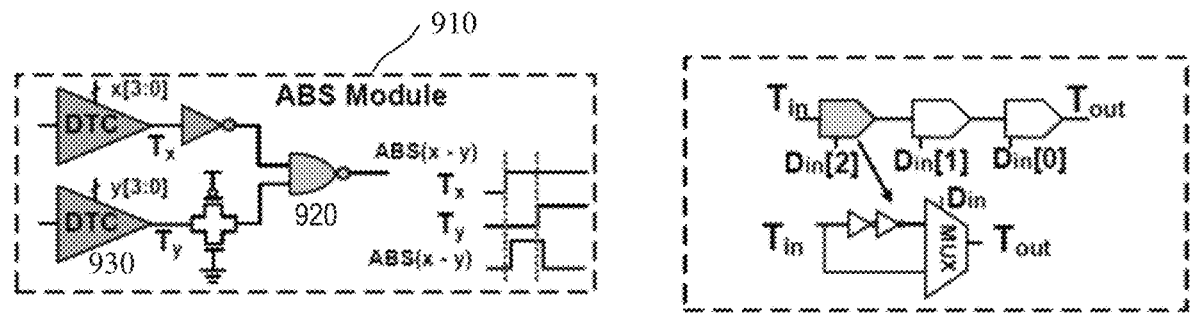
Figure 10:
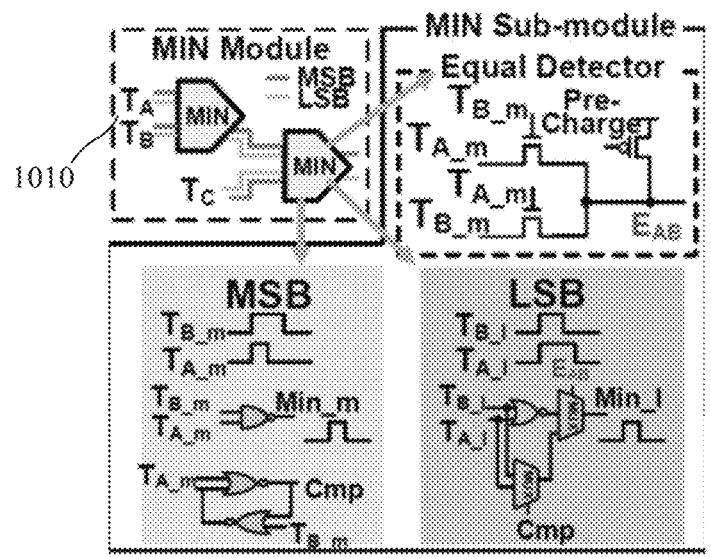

During readout phase, the stored pulse is sent out from the output pin 615 of the ring 610 with pulse width equivalent to the stored values. When the ring is filled, a carry signal rises and the ring will rotate back with reminder values stored inside. The "rotation" operation provides a scalable operation into multi-bit groups. Different from conventional D-flip-flops 510, each TFF 650 can process multi-bit signals. In on example, each TFF 650 can store a 6-bit time domain signal and two TFFs 810 (see FIG. 8) are used to construct a 10-bit time-domain values separated into MSB and LSB units, leading to a wide TFF module (WTFF) 810 as shown in FIG. 8. In the WTFF 810, once the LSB TFF is full, a carry signal is sent to a pulse generator to generate an extra pulse to be stored in the MSB TFF extending the operation into 10 bits. FIGS. 9 and 10. also shows the MIN module 1010 and ABS module 910 used in this work, consisting of only simple digital gates, e.g. NAND 920, rendering a four times reduction compared with equivalent digital implementation. A 4-bit digital-time-converter (DTC) 930 is used inside ABS 910 to convert input digital values into time-domain pulses.

Figure 7:
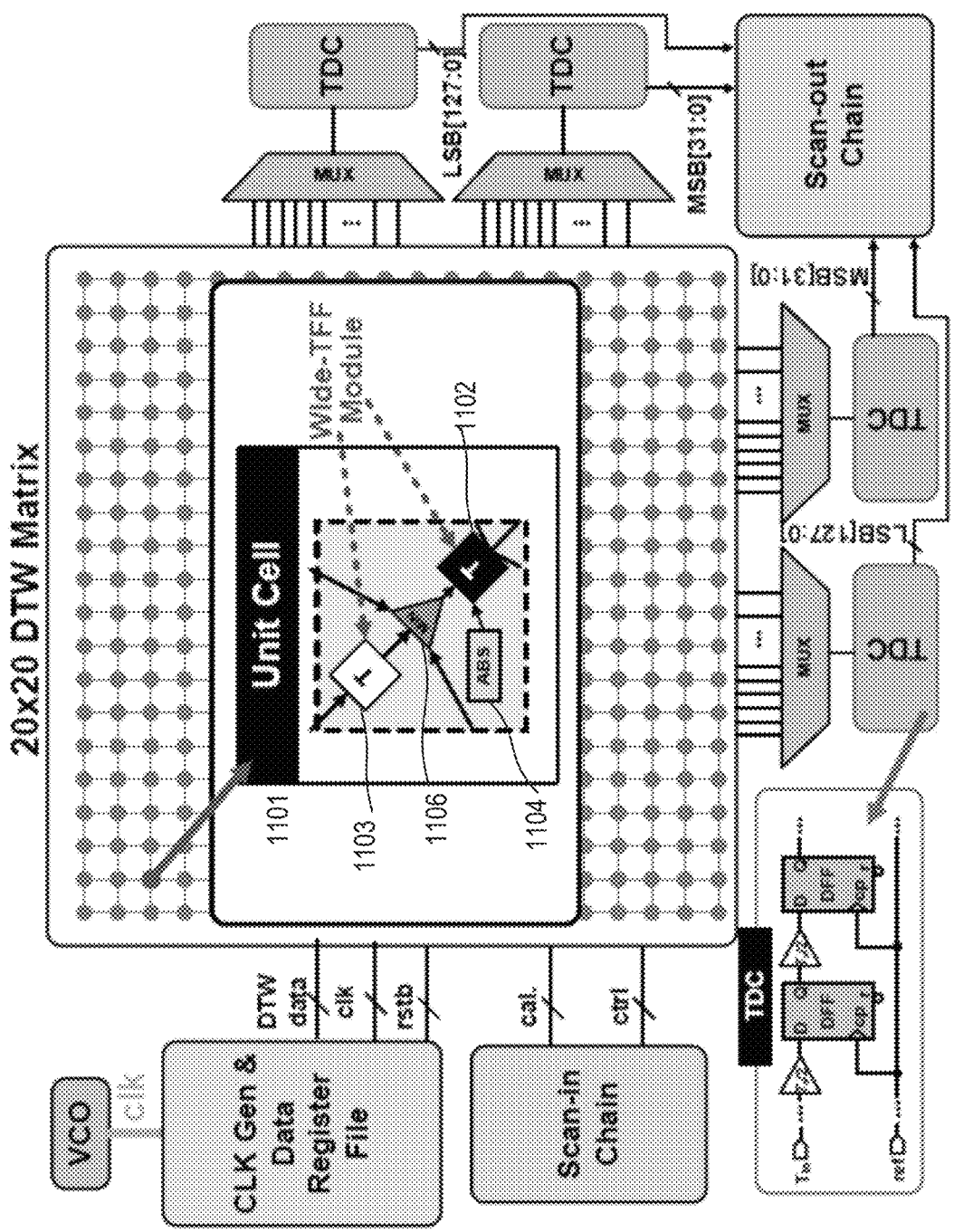
FIG. 7 illustrates an a test chip block diagram.
Figure 11:
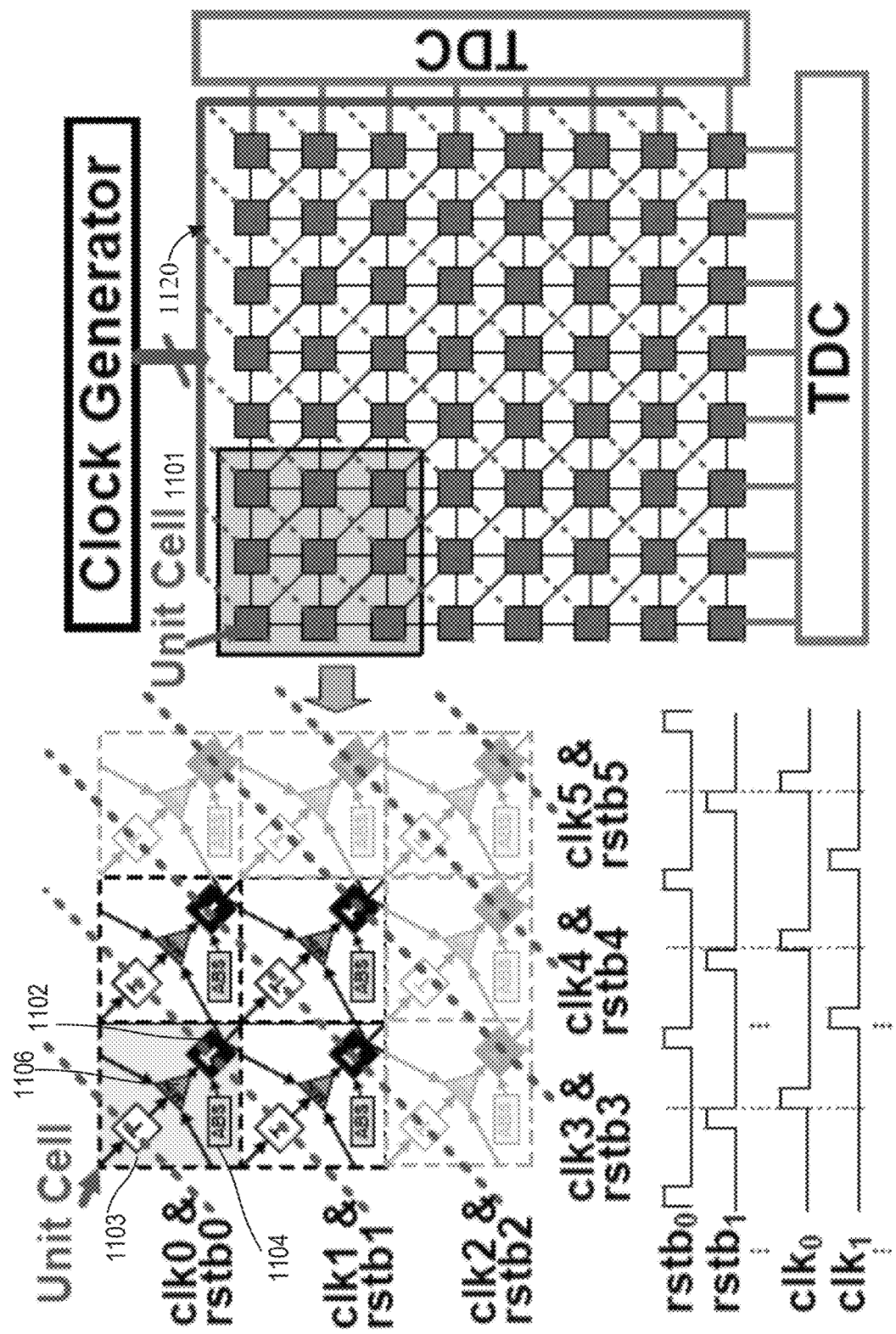
FIG. 11 illustrates a pipeline mode of the dynamic time warping engine.
Figure 13:
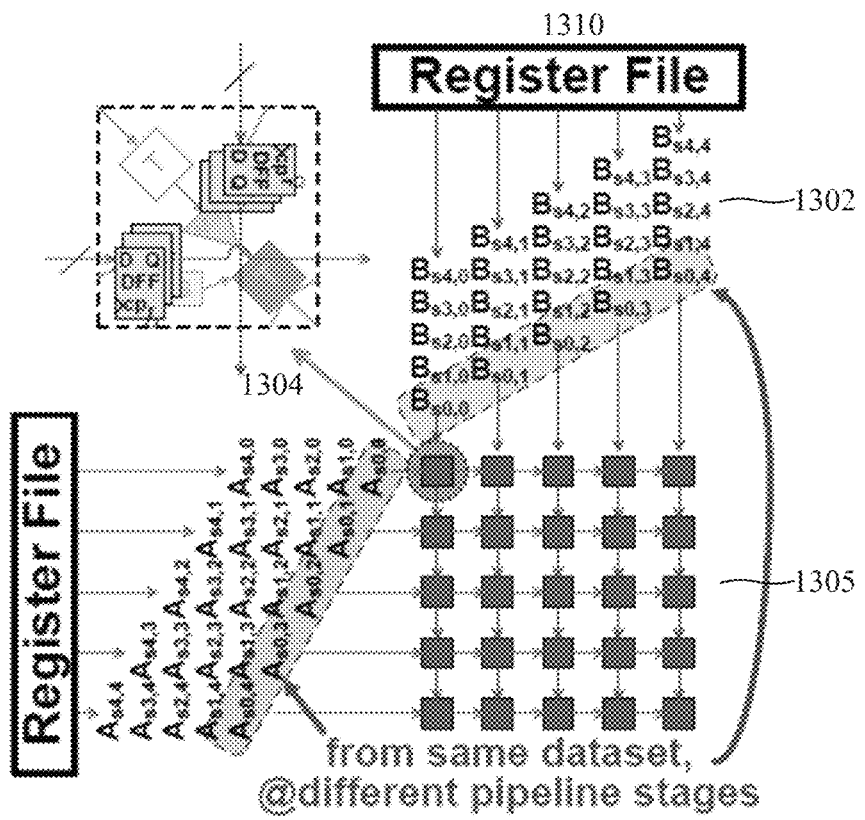
FIG. 13 illustrates a pipeline data streaming flow.

FIGS. 7 and 11 shows the pipelined DTW engine 700 (1100) with 20×20 DTW unit cells 701 (1101) and scalable operation to construct longer time series. The DTW matrix 720 (1120) contains a group of DTW unit cells 701 with a diagonal pipeline structure. The unit cell 701 (1101) of the DTW engine contains 2 WTFF modules 702 (1102), 703 (1103) an ABS module 704 (1104), and a MIN module 706 (1106). The second WTFF module 703 (1103) in the unit cell is used to copy the data from last pipeline stage because the data stored in node (i−1, j−1) is one pipeline stage earlier than the nodes (i−1, j) and (i, j−1). Due to the use of TFF, in every clock cycle, the data pulses are propagated along the diagonal direction of the matrix. FIG. 13 also shows data streaming flow for the pipeline operation where incoming digital data 1302 is fed from an on-chip register file 1310 and clock management unit. Each data is piped through the DTW matrix 1305 as inputs to ABS modules 1304 both vertically and horizontally.

Figure 12:
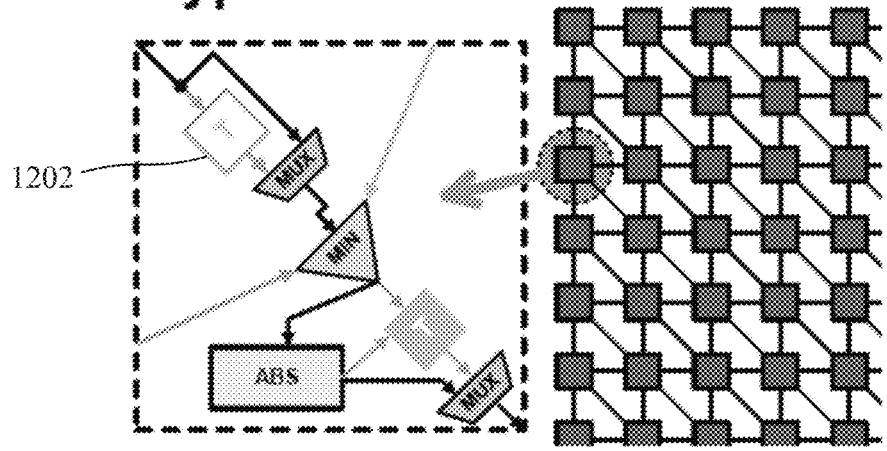
FIG. 12 illustrates a non-pipeline mode of the dynamic time warping engine.
Figure 14:
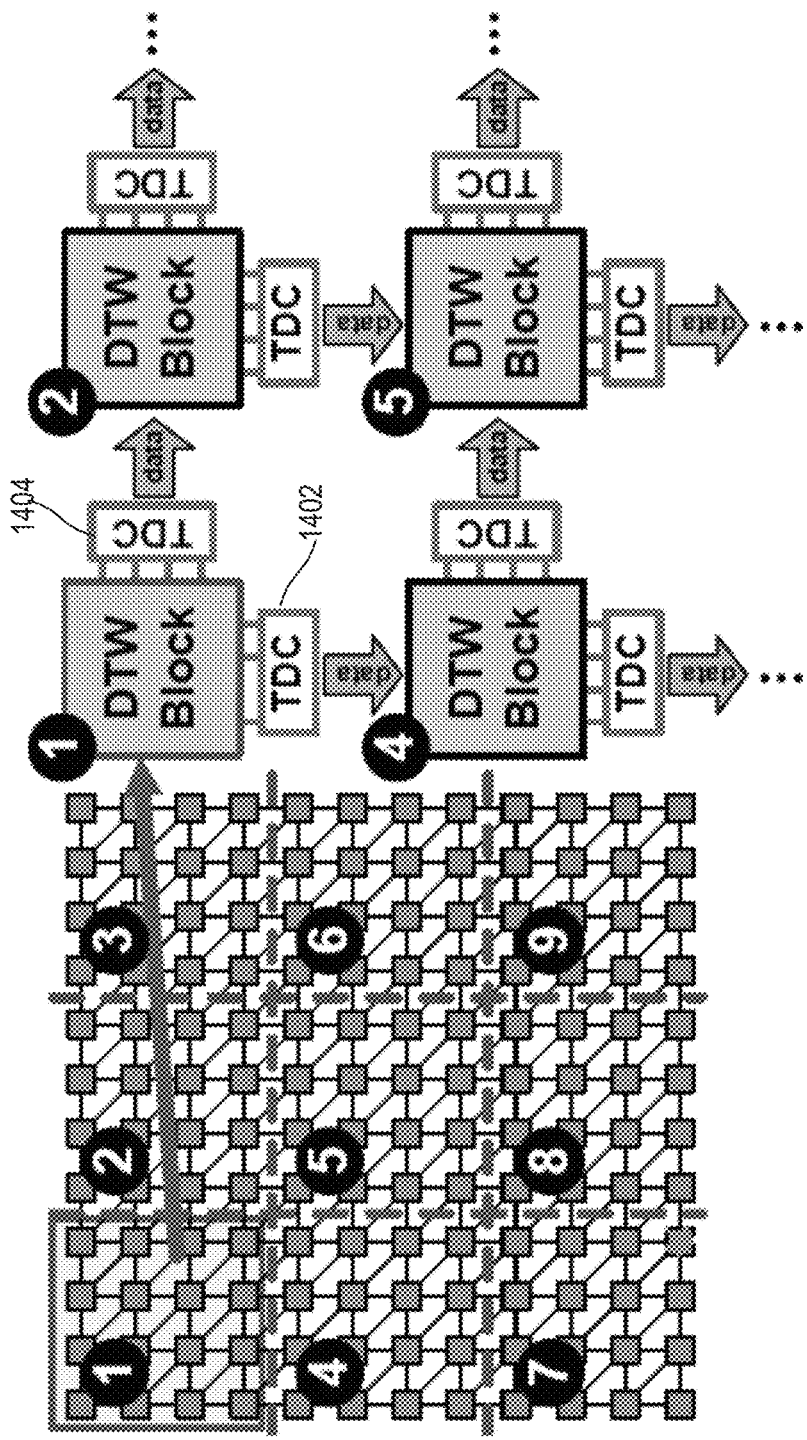
FIG. 14 illustrates an unfolding operation of long sequence.

FIG. 14 illustrates an exemplary unfolding operation of long sequence. The pipeline operation allows the fixed dimension of DTW to be unfolded for longer data sequence as shown in FIG. 14. All the output pulses from bottom and right boundaries are decoded by two shared time-to-digital converter (TDC) 1402, 1404 every clock cycle and re-sent back for the processing of following sections. To speed up the operation for simple data sequence, e.g. DNA sequence, a non-pipeline mode is also created by bypassing the TFF modules 1202 (e.g., using a MUX) and allowing signal pulses to directly propagate through the matrix (see FIG. 12). In addition, a 2-bit tunable delay cell 1505 is implemented in each unit cell 1502 to tune the output pulse width compensating any process variation impacts.

Figure 15:
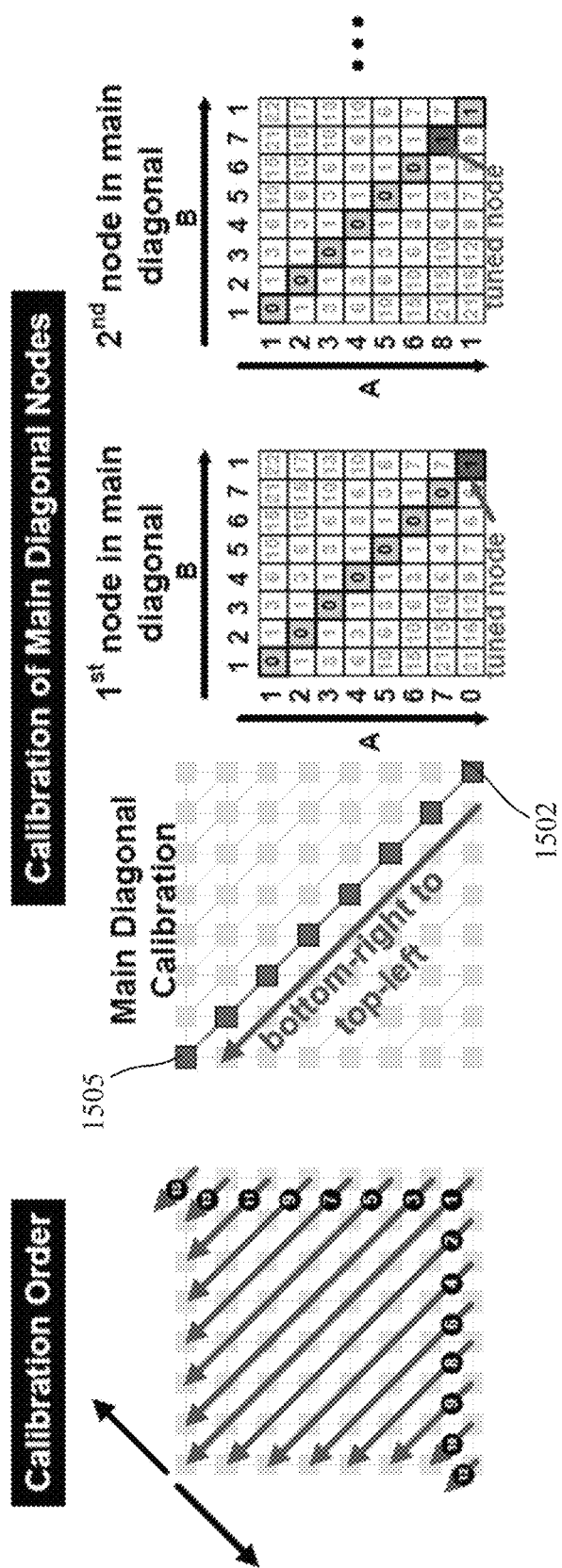
FIG. 15 illustrates a DTW matrix calibration scheme.

FIG. 15 illustrates an exemplary DTW matrix calibration scheme. The basic idea of calibrating the DTW matrix is to create special input data sets. The data sets only let a particular DTW node in a data-path have non-zero input when calibrating through different diagonals from a center position to a side position. The calibration is processed through a center diagonal to the side diagonals, and on each diagonal the nodes are calibrated form bottom-right 1502 to top-left 1505. With the proposed calibration scheme, the error rate of the DTW matrix drops from 5 LSB to only 1.5 LSB.

Figure 16:
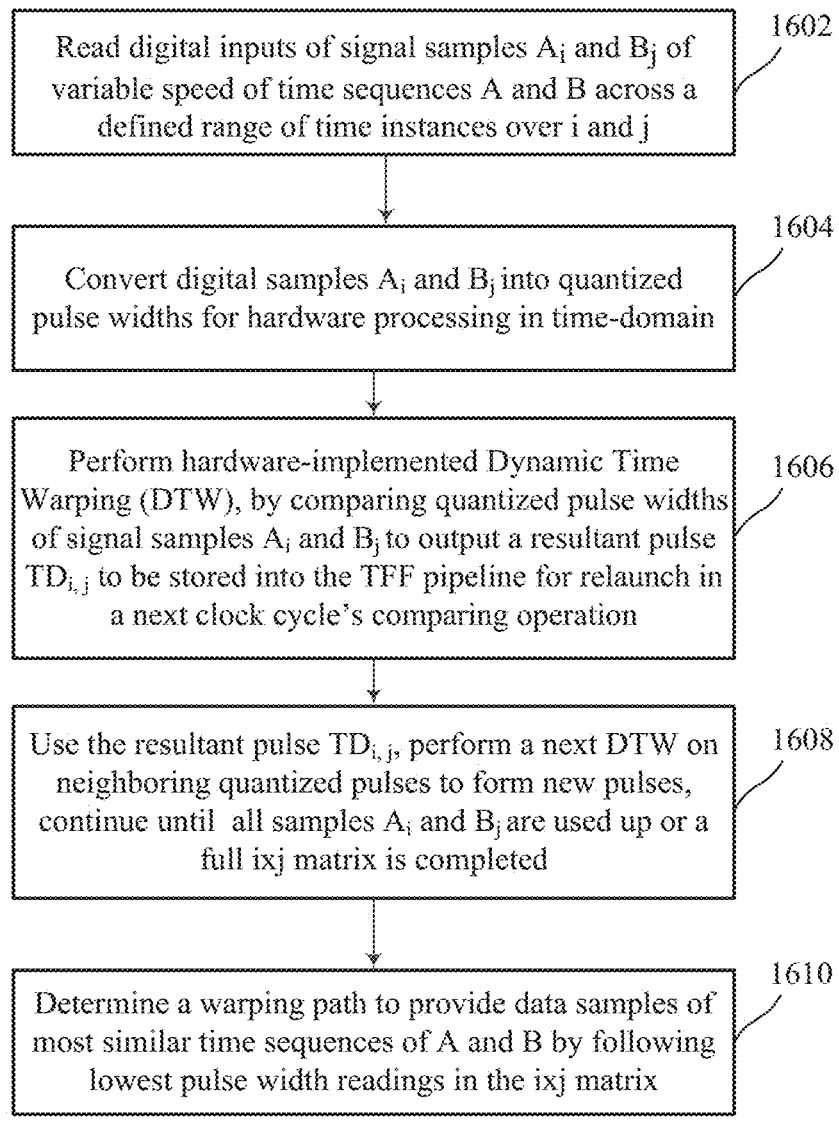
FIG. 16 illustrates a flow chart for processing time sequence signals.

FIG. 16 is an exemplary flow chart illustrating processing time sequence signals by a hardware implemented method in the time-domain. The hardware may be a scalable pipelined structure (see FIGS. 6-12) having multi-bit ring-based time flip-flops (TFF), to perform dynamic time warping (DTW) between two time sequences A and B that detect data similarities as a node $D_{i,j}$ in the pipeline structure. At step 1602, the TFF may read digital inputs of signal samples Ai and Bj of variable speed of time sequences A and B across a defined range of time instances over i and j, each of the $A_i$ and $B_j$ time sample signals has a numerical value which is proportional to a duration of time pulse at a time instance i and j, respectively. At step 1604, the time signal samples $A_i$ and $B_j$ may be read in digital from the sequences A and B, and the time signal samples $A_i$ and $B_j$ may be converted into quantized pulse widths prior to performing the time-domain hardware DTW operations.

At step 1606, the process performs the time-domain pulse comparison operation by taking an absolute difference operation on the pair of time sample signals $A_i$ and $B_j$ to obtain the resultant time pulse $T(D_{i,j})$, wherein $T(D_{i,j})$=ABS $(A_i-B_j)$ and the resultant time pulse $T(D_{i,j})$ is stored in the TFF for carrying out more time-domain pulses comparison operation with neighboring nodes in a next clock cycle to generate new resultant time pulses $T(D_{i,j})$, until all nodes $D_{i,j}$ within an i×j dimension matrix between the time sequences A and B are determined.

At step 1608, the time-domain pulses comparison operation may additionally take a minimum value operation (MIN) of three ancestor nodes $(D_{i-1,j}, D_{i-1,j-1}, D_{i,j-1})$, wherein $T(D_{i,j})$=MIN $(D_{i-1,j}, D_{i-1,j-1}, D_{i,j-1})$ and the pulse $T(D_{i,j})$ forms a node $D_{i,j}$ to populate an i×j dimension matrix between the time sequences A and B. the time-domain pulses comparison operation includes operating in a pipeline mode by reading the resultant time pulse $T(D_{i,j})$ of the (ABS) operation stored in the TFF, for a next cycle MIN operation to form respective nodes $D_{i,j}$ to populate the i×j dimension matrix.

At step 1610, the time-domain hardware implemented method may include a multiplexer (MUX) to facilitate by-pass node pulse data reading from an input TFF to speed up the DTW operations. The stored pulse widths values of the nodes $D_{i,j}$ readings may be improved by performing fine tuning diagonally in the i×j matrix from a bottom right to top left direction. The time-domain hardware may use a NAND gate to perform the ABS operation, wherein only one of the NAND gate's input is buffered by an inverter. The time-domain hardware implemented method also include using a multi-input NOR gate to directly perform the MIN operation on time-domain pulses. The TFF in the pipelines are used to store the resultant time pulse $T(D_{i,j})$ for a future clock cycle operations and to perform accumulation operations in DTW calculations when enabled. The accumulation function in the TFF may be disabled when not used. In another example, the pipelined structure is scalable by simply cascading the pipelined structure horizontally and vertically to increase sequence length for reading more time sample signals $A_i$ and $B_j$ simultaneously.

Alternate systems may include any combination of structure and functions described or shown in one or more of FIGS. 1-16. These systems are formed from any combination of structures and functions described. The structures and functions may process the same, additional, or different input and may include other devices and distributed sources to provide localized or real-time processing. Alternate systems illustratively disclosed herein may be practiced in the absence of any element and functionality which is not specifically disclosed herein. In some alternate systems, when elements and/or functions are not disclosed herein, those alternate systems are devoid of or operate in the absence of those non-disclosed elements and/or functions. In yet other alternate systems, the disclosed devices and functions are recited individually, rather than as an inseparable whole. In these alternate systems, one or more but not all of the recited elements and all of the recited functions disclosed herein may be completely lacking, devoid, or may be excluded from some alternate systems.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

We claim:

1. A time-domain hardware implemented method for processing time sequences signals, comprising:
performing, using a scalable pipelined structure that comprises multi-bit ring-based time flip-flops (TFF), dynamic time warping (DTW) between two time sequences A and B to detect data similarities as a node $D_{i,j}$ in the pipeline structure, wherein the time sequences A and B each comprises time sample signals $A_i$ and $B_j$ of variable speed, respectively, wherein:
each of the $A_i$ and $B_j$ time sample signals has a numerical value which is proportional to a duration of time pulse at a time instance i and j, respectively, and
the node $D_{i,j}$ is stored as a resultant time pulse $T(D_{i,j})$ in the TFF for a next clock cycle operation, and the resultant time pulse $T(D_{i,j})$ is obtained by directly performing at least a time-domain pulses comparison operation on a pair of time sample signals $A_i$ and $B_j$.

2. The time-domain hardware implemented method of claim 1, wherein the time-domain pulses comparison operation comprising performing an absolute difference operation (ABS) on the pair of time sample signals $A_i$ and $B_j$ to obtain the resultant time pulse $T(D_{i,j})$, wherein $T(D_{i,j})$=ABS $(A_i-B_j)$ and the resultant time pulse $T(D_{i,j})$ is stored in the TFF for carrying out more time-domain pulses comparison operation with neighboring nodes in a next clock cycle to generate new resultant time pulses $T(D_{i,j})$, until all nodes $D_{i,j}$ within an i×j dimension matrix between the time sequences A and B are determined.

3. The time-domain hardware implemented method of claim 2, wherein a path of nodes $D_{i,j}$ within the i×j dimension matrix having the lowest pulse widths forms a warping path which aligns respective pairs of time sample signals $A_i$ and $B_j$ between the time sequences A and B, and wherein a pulse width value of a terminating node $D^*_{i,j}$ at an opposite diagonal corner from a starting node of an i×j dimension matrix represents a final distance which indicates how much similarities between the time sequences A and B.

4. The time-domain hardware implemented method of claim 1, wherein the time-domain pulses comparison operation comprising taking a minimum value operation (MIN) of three ancestor nodes $(D_{i-1,j}, D_{i-1,j-1}, D_{i,j-1})$, wherein $T(D_{i,j})$= MIN $(D_{i-1,j}, D_{i-1,j-1}, D_{i,j-1})$ and the pulse $T(D_{i,j})$ forms a node $D_{i,j}$ to populate an i×j dimension matrix between the time sequences A and B.

5. The time-domain hardware implemented method of claim 4, wherein the time-domain pulses comparison operation comprising operating in a pipeline mode by reading the resultant time pulse $T(D_{i,j})$ of an absolute difference operation (ABS) operation stored in the TFF, for a next cycle MIN operation to form respective nodes $D_{i,j}$ to populate the i×j dimension matrix.

6. The time-domain hardware implemented method of claim 5, comprising using a multiplexer (MUX) to by-pass node pulse data reading from an input TFF to speed up the DTW operations.

7. The time-domain hardware implemented method of claim 1, wherein the time signal samples $A_i$ and $B_j$ are read in digital from the sequences A and B, and the time signal samples $A_i$ and $B_j$ are converted into quantized pulse widths prior to performing an absolute difference operation ABS or a minimum value operation (MIN) operation.

8. The time-domain hardware implemented method of claim 5, further comprising fine tuning diagonally in the i×j matrix, the stored pulse widths values of the nodes $D_{i,j}$.

9. The time-domain hardware implemented method of claim 2, comprising using a NAND gate having a plurality of NAND gate inputs to perform the ABS operation, wherein only one of the plurality of NAND gate inputs is buffered by an inverter.

10. The time-domain hardware implemented method of claim 4, comprising using a multi-input NOR gate to directly perform the MIN operation on time-domain pulses.

11. The time-domain hardware implemented method of claim 1, wherein the TFF in the pipelines are used to store the resultant time pulse $T(D_{i,j})$ for a future clock cycle operations and to perform accumulation operations in DTW calculations when enabled.

12. The time-domain hardware implemented method of claim 1, wherein the pipelined structure is scalable by simply cascading the pipelined structure horizontally and vertically to increase sequence length for reading more time sample signals $A_i$ and $B_j$ simultaneously.

* * * * *